United States Patent
Shin et al.

(10) Patent No.: US 7,493,136 B2
(45) Date of Patent: Feb. 17, 2009

(54) APPARATUS AND METHOD FOR CONTROLLING REVERSE TX POWER IN A MOBILE TERMINAL

(75) Inventors: Yoon-Mo Shin, Hwasung-si (KR); Jae-Sun Park, Suwon-si (KR)

(73) Assignee: Samsung Electronics Co., Ltd (KR)

(*) Notice: Subject to any disclaimer, the term of this patent is extended or adjusted under 35 U.S.C. 154(b) by 579 days.

(21) Appl. No.: 11/328,850

(22) Filed: Jan. 10, 2006

(65) Prior Publication Data
US 2006/0154685 A1 Jul. 13, 2006

(30) Foreign Application Priority Data
Jan. 10, 2005 (KR) .................. 10-2005-0001994

(51) Int. Cl.
*H04Q 7/20* (2006.01)
(52) U.S. Cl. .................. 455/522; 455/68; 455/69; 455/500; 455/127.1; 455/127.2
(58) Field of Classification Search ............ 455/522, 455/501, 500, 69, 68, 127, 517, 403, 422.1, 455/445, 550.1, 67.11, 127.2, 423–425; 370/310, 370/328, 329
See application file for complete search history.

(56) References Cited

U.S. PATENT DOCUMENTS 7,200,127 B1 * 4/2007 Lee et al. .................. 370/335

FOREIGN PATENT DOCUMENTS

| KR | 10-2002-0057185 | 7/2002 |
| KR | 10-2002-0078064 | 10/2002 |

* cited by examiner

*Primary Examiner*—Keith T Ferguson
(74) *Attorney, Agent, or Firm*—The Farrell Law Firm, PC

(57) ABSTRACT

Disclosed are an apparatus and a method for controlling reverse TX power in a mobile terminal. The apparatus includes a closed-loop power controller for limiting a TX power increase due to a power control bit of an RX signal by using a power-up limit bit and outputting a closed-loop power control value for decreasing the TX power when a TX power limit mode is selected, an adder for calculating a TX power by adding the closed-loop power control value and an open-loop power set using a power of the RX signal, and a maximum TX power limiter for setting a final TX power by subtracting a maximum TX power limit reference value determined according to an RX signal strength in the mobile terminal from the calculated TX power. Accordingly, it is possible to extend a call duration while accepting a rather poor call quality.

8 Claims, 2 Drawing Sheets

APPARATUS AND METHOD FOR CONTROLLING REVERSE TX POWER IN A MOBILE TERMINAL

PRIORITY

This application claims priority under 35 U.S.C. § 119 to an application entitled "Apparatus And Method For Controlling Reverse TX Power In Mobile Terminal" filed in the Korean Intellectual Property Office on Jan. 10, 2005 and assigned Serial No. 2005-1994, the contents of which are incorporated herein by reference.

BACKGROUND OF THE INVENTION

1. Field of the Invention

The present invention relates to an apparatus and method for controlling reverse transmission TX power in a mobile terminal, and more particularly, to an apparatus and method for limiting a reverse maximum TX power through closed-loop power control in a mobile terminal, thereby extending the lifetime of a battery and increasing the call duration.

2. Description of the Related Art

The use of mobile terminals is rapidly increasing because they are handy to carry. With the increasing use of mobile terminals, service providers (terminal manufacturers) have made efforts to provide a more stable and reliable call quality and to provide a variety of services so as to attract many users.

In mobile communication systems, signals received at a base station have a different power, depending on distances between mobile terminals and the base station. Also, signal fading occurs in each mobile terminal. In order to overcome these problematic environments and thus maximize a subscriber capacity, precise power control is required which has a large operating range in a reverse link.

The mobile terminal has poor call quality at a low TX power, while it has good call quality at a high TX power. The high TX power, however, causes greater interference to other mobile terminals using the same channel, resulting in poor call quality at other mobile terminals.

In order to solve the above problem, the mobile terminal performs reverse power control. The reverse power control is classified into reverse open-loop power control and reverse closed-loop power control.

The reverse open-loop power control is performed for estimation of an initial access TX power in the mobile terminal. The mobile terminal estimates the power to be transmitted to the base station by measuring the power of a signal received from the base station. The reverse open-loop power control makes it possible to receive the same power without regard to locations of mobile terminals within a cell, thus providing a call service to a larger number of users.

The reverse closed-loop power control is performed by a command transmitted from the base station. The base station measures an $E_C/I_O$ ($E_C$ is a signal strength of pilot channel and $I_O$ is strength of interferences) value of a signal received from the mobile terminal. The base station compares the $E_C/I_O$ value with a predetermined threshold value at every 1.25 ms and commands the mobile terminal to increase or decrease a TX power according to the comparison results. The mobile terminal increases or decreases its TX power according to a power control bit of a signal received from the base station. When the $E_C/I_O$ value is smaller than the threshold value, the power control bit is set to "0". On the contrary, when the $E_C/I_O$ value is greater than the threshold value, the power control bit is set to "1". When the power control bit is "0", the mobile terminal increases its TX power by 1 dB. Otherwise, when the power control bit is "1", the mobile terminal decreases its TX power by 1 dB. Accordingly, the TX power of the mobile terminal compensates for a deviation error in the reverse open-loop power control.

As described above, reverse power control is performed for good call quality. However, there may occur a case where a user of the mobile terminal must make a long and important call without an available battery charger for the mobile terminal. In this case, a method is needed for reducing the battery power consumption of the mobile terminal so as to extend a call duration while accepting a rather poor call quality.

SUMMARY OF THE INVENTION

The present invention provides an apparatus and method for controlling a reverse TX power in a mobile terminal.

Also, the present invention provides an apparatus and method for controlling a reverse closed-loop power control in a mobile terminal.

According to an aspect of the present invention, an apparatus for controlling reverse TX power in a mobile terminal includes a closed-loop power controller for limiting a TX power increase due to a power control bit of an received (RX) signal by using a power-up limit bit and outputting a closed-loop power control value for decreasing the TX power when a TX power limit mode is selected; an adder for calculating a TX power by adding the closed-loop power control value and an open-loop power set using a power of the RX signal; and a maximum TX power limiter for setting a final TX power by subtracting a maximum TX power limit reference value determined according to an RX signal strength in the mobile terminal from the calculated TX power.

According to another aspect of the present invention, a method for controlling reverse TX power in a mobile terminal includes the steps of setting a maximum TX power limit reference value according to an RX signal strength in the mobile terminal when a TX power limit mode is selected; setting a closed-loop power control value indicating power up/down according to a power control bit of the RX signal; calculating a TX power by adding the closed-loop power control value and an open-loop power set using an RX power of the RX signal; comparing the an RX strength of the RX signal with a predetermined RX strength; and determining a final TX power by subtracting the maximum TX power limit reference value from the calculated TX power when the RX strength of the RX signal is stronger than the predetermined RX strength.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. A detailed description of well-known features will be omitted for conciseness.

The present invention proposes a technique for controlling a reverse maximum TX power in a mobile terminal. It should be noted that the mobile terminal described herein includes various kinds of mobile terminals such as a cellular phone, a Personal Communication System (PCS) phone, a Personal Data Assistant (PDA) terminal, and an International Mobile Tele-communication-2000 (IMT-200) terminal. A following description will be made with respect to a general structure of the terminals.

Figure 1:
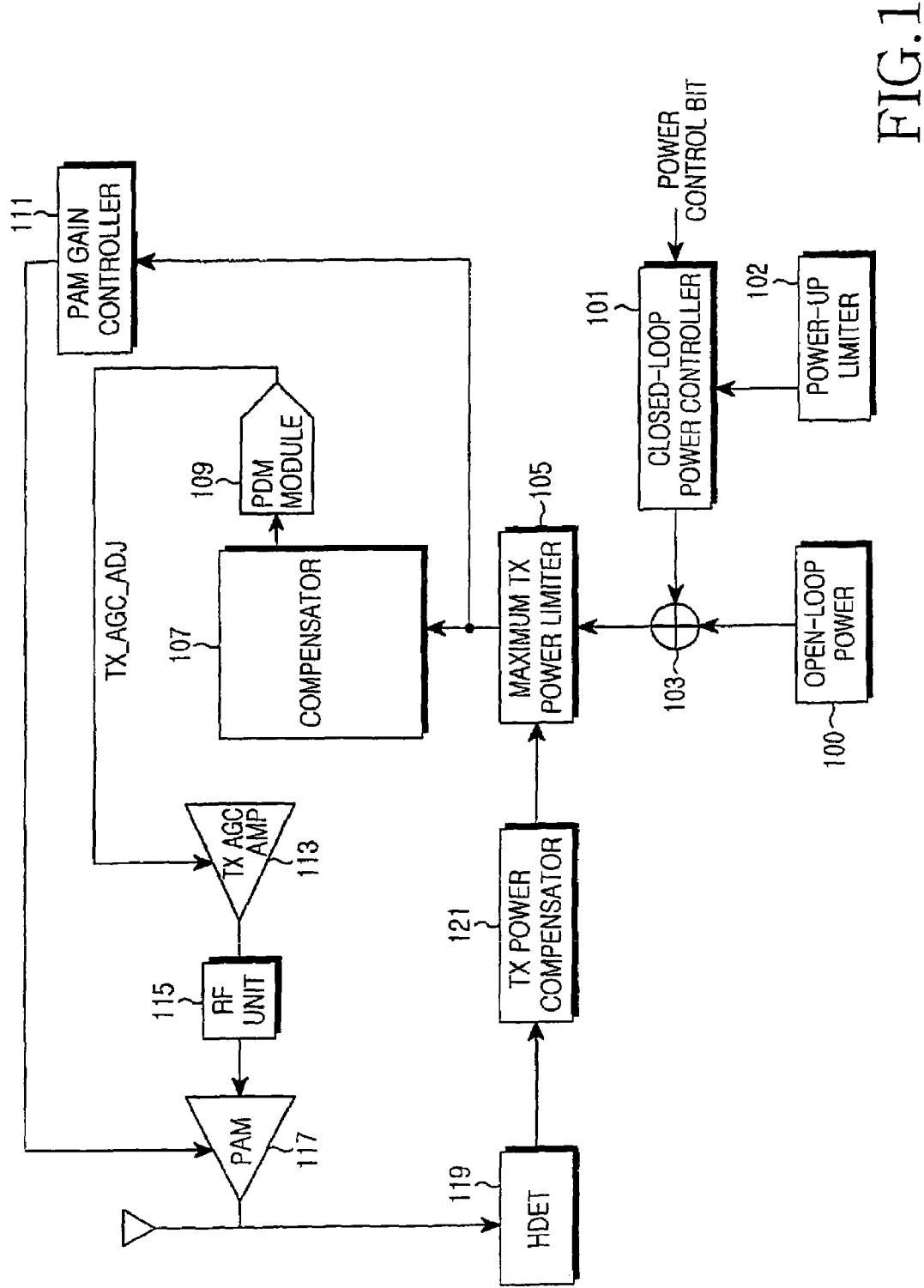
FIG. 1 is a block diagram illustrating an apparatus for controlling reverse TX power in a mobile terminal according to an embodiment of the present invention.

FIG. 1 is a block diagram illustrating an apparatus for controlling reverse TX power in a mobile terminal according to an embodiment of the present invention.

Referring to FIG. 1, the apparatus includes a closed-loop power controller 101, a power-up limiter 102, an adder 103, a maximum TX power limiter 105, an COMPENSATOR 107, a pulse density modulation (PDM) module 109, a power amplifier module (PAM) gain controller 111, a TX power compensator 121, a TX automatic gain control amplifier (AGC AMP) 113, an RF unit 115, a PAM 117, and a high power detector (HDET) 119.

An open-loop power 100 is estimated by applying the power of a signal received from a base station to Equation 1 below, and the estimated open-loop power is inputted to the adder 103.

Mean Output Power(dBm)=Mean Input Power(dBm)+
Offset Power+Interference Correction+
NOM_PWR−16*NOM_PWR_EXT+INIT_PWR     (1)

In Equation 1, Mean Output Power, Mean Input Power, and Offset Power represent an open-loop power, a received signal strength indicator (RSSI), and a Constant for a reverse TX power control, respectively. For example, in the case of a cellular phone, the constant is −73. In case of a PCS phone, the constant is −76.

Interference Correction represents a value for compensating an initial estimation power for an interference component of a neighboring pilot signal. NOM_PWR, NOM_PWR_EXT, and INIT_PWR are access parameters, which are transmitted from the base station to the mobile station. NOM_PWR represents a compensation value enabling the base station to receive an accurate power. For example, in the case of a cellular phone, the NOM_PWR_EXT is always "0". In the case of a PCS phone having a more serious fading problem than the cellular phone, the NOM_PWR_EXT represents a value for extending the range of the compensation value. The INIT_PWR represents a compensation value enabling a first probe value of an access channel to start at a rather small value.

When a TX power limit mode is performed by key manipulation by a user, the power-up limiter 102 measures an RX signal strength (for example, an $E_C/I_O$) received at the mobile terminal and compares the measured RX signal strength with a predetermined threshold value so as to prevent a call impossible state due to a serious degradation in call quality. When the RX signal strength is greater than the threshold value, the power-up limiter 102 generates a signal for limiting a power increase during closed-loop power control and provides the generated signal to the closed-loop power controller 101.

For example, when the RX power is greater than the threshold value during the TX power limit mode, the power-up limiter 102 sets a closed-loop power-up limit bit to "0" and provides the closed-loop power-up limit bit "0" to the closed-loop power controller 101 so as to limit the power increase. When the TX power limit mode is terminated, the power-up limiter 102 sets the closed-loop power-up limit bit to "1" and provides the closed-loop power-up limit bit "1" to the closed-loop power controller 101 so as to terminate the power-up limit operation.

The closed-loop power controller 101 receives and despreads an RX signal by a finger (not shown) and extracts a power control bit from a signal received from the base station. When the power control bit is 1, the closed-loop power controller 101 generates a closed-loop power control value for decreasing a TX power by 1 dB. On the contrary, when the power control bit is 0, the closed-loop power controller 101 generates a closed-loop power control value for increasing the TX power by 1 dB. The generated closed-loop power control values are provided to the adder 103. Also, the closed-loop power controller 101 receives the closed-loop power-up limit bit from the power-up limiter 102. When the closed-loop power-up limit bit is "0", a power increase is limited. On the contrary, when the closed-loop power-up limit bit is "1, the closed-loop power controller 101 operates according the power control bit values.

Here, when an $E_C/I_O$ value of a signal received at the base station from the mobile terminal is less than a predetermined $E_C/I_O$ value, the power control bit is set to "0". On the contrary, when the $E_C/I_O$ value is greater than the predetermined $E_C/I_O$ value, the power control bit is set to "1".

The adder 103 adds the open-loop power and the closed-loop power control value from the closed-loop power controller 101 to output a reverse TX power.

When performing the TX power limit mode on the reverse TX power from the closed-loop power controller 101, the maximum TX power limiter 105 sets the maximum TX power by using predetermined maximum TX power limit reference values. That is, when the TX power limit mode is selected by key manipulation, the maximum TX power limiter 105 limits the strength of the reverse TX power to thus set the maximum TX power by using a reference value selected from the predetermined maximum TX power limit reference values (for example, High=5 dB, Middle=3 dB, Low=1 dB) according to an RX signal strength of the mobile terminal.

For example, when the maximum TX power limit reference values are predetermined as High=5 dB, Middle=3 dB, Low=1 dB, one of the maximum TX power limit reference values is selected by measuring the RX signal strength of the mobile terminal. If the RX signal strength is strong, "High" is selected because the RX signal power is strong. Thus, if the reverse RX power from the adder 103 is 7 dBm, the maximum TX power is set to 2 dBm [=7 dBM (reverse TX power)−5 dBm (maximum TX power limit reference value: High)].

Also, the maximum TX power limiter 105 compensates the set maximum TX power for a TX power compensation value received from the TX power compensator 121, thereby outputting the final TX power to the COMPENSATOR 107 and the PAM gain controller 111. The COMPENSATOR 107 compensates for the nonlinearity of the TX AGC AMP 113 according to the output power by using 4 TX linearizers. The 4 TX linearizers are used because the nonlinearity varies according to the strength of each signal. In this embodiment, the COMPENSATOR 107 selects one of the 4 TX linearizers according to the final TX power and corrects the final TX power so as to compensate for the nonlinearity of the TX AGC AMP 113.

The PAM gain controller 111 outputs a gain value for adjusting a gain value of the PAM 117 according to the final TX power.

The PDM 109 includes a counter and a comparator and serves as a digital to analog (D/A) converter. The PDM 109 outputs a control signal for an analog circuit in a baseband processor. In this embodiment, the PDM 109 converts the corrected final TX power received from the COMPENSATOR 107 into a PDM signal for controlling the TX AGC AMP 113 and outputs the PDM signal to the TX AGC AMP 113. The TX AGC AMP 113 amplifies a TX signal received from an upper layer (not shown) by the final gain value generated at the PDM 109.

The RF unit 115 converts the amplified TX signal received from the TX AGC AMP 113 into a TX frequency band signal, removes an unnecessary frequency component from the TX frequency band signal, and outputs the resulting signal to a power amplifier 117. The PAM 117 amplifies the resulting signal from the RF unit 115 by the gain value from the PAM gain controller 111 so that a signal of sufficient power is transmitted through the final port. The amplified signal from the PAM 117 is transmitted through an antenna.

The HDET 119 couples the transmitted (TX) signal so as to finely adjust the maximum output of the TX signal. The TX power compensator 121 converts the coupled TX signal from HDET 119 into a digital signal and compares the digital signal with a predetermined TX power, thereby outputting a TX compensation value. That is, the TX compensation value is used to compensate for a difference between the predetermined TX power and the actual TX signal. The TX power compensator 121 provides the TX compensation value to the maximum TX power limiter 105 to thus compensate the maximum TX power for the difference value.

Figure 2:
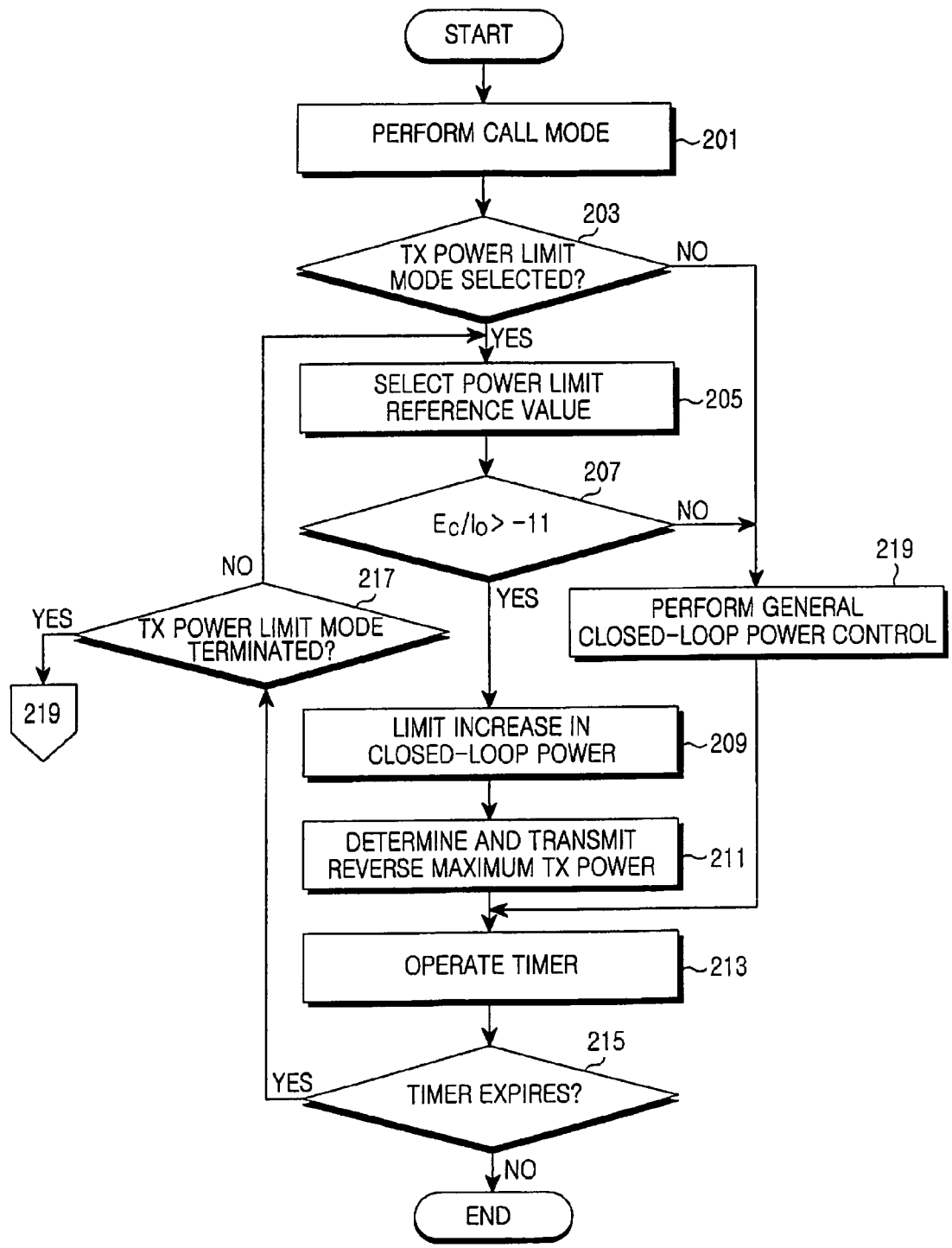
FIG. 2 is a flowchart illustrating a process for controlling reverse TX power in a mobile terminal according to an embodiment of the present invention.

FIG. 2 is a flowchart illustrating a process for controlling the reverse TX power in the mobile terminal according to an embodiment of the present invention. Referring to FIG. 2, when a call mode is performed in Step 201, the process proceeds to Step 203, in which the mobile terminal determines whether the TX power limit mode is selected by key manipulation. That is, the mobile terminal determines whether to limit the maximum TX power so as to extend a call duration while accepting a rather poor call quality. If the TX power limit mode is not selected in Step 203, the process proceeds to Step 219, and if the TX power limit mode is selected, the process proceeds to Step 205.

In Step 205, the mobile terminal sets a reference value for limiting the maximum TX power. For example, when the maximum TX power limit reference values are predetermined as High=5 dB, Middle=3 dB, Low=1 dB, one of the maximum TX power limit reference values is selected according to a current RX signal strength of the mobile terminal. If the RX signal strength, that is the RX signal power, is strong, the maximum TX power limit reference value is set to "High". Otherwise, if the RX signal strength, that is the RX signal power, is weak, the maximum TX power limit reference value is set to "Low".

In Step 207, the mobile terminal compares the RX signal strength (for example, an $E_C/I_O$ value) with a predetermined RX signal strength (for example, −11). This aims to prevent a call impossible state due to a serious degradation in call quality. If the RX signal strength is less than the predetermined RX signal strength in Step 207, the process proceeds to Step 219, and if not, the process proceeds to Step 209.

In Step 219, the mobile terminal performs a general closed-loop power control. That is, the mobile terminal measures an RX signal power, and sets the final TX power by using the measured RX signal power and the closed-loop power control value measured at the closed-loop power controller 101.

In Step 209, the mobile terminal activates the power-up limiter 102 to thus limit a TX power-up control value of the closed-loop power control values. That is, when the TX power limit mode is performed, the power-up limiter 102 sets the closed-loop power-up limit bit to "0" to thus limit an increase in the TX power-up control value.

In Step 211, the mobile terminal determines the final TX power by subtracting the maximum TX power limit reference value set in Step 205 from the reverse TX power calculated by the adder 103, and then transmits a signal having the final TX power.

In Step 213, the mobile terminal operates a timer that expires after an elapse of a given time. The timer is used to control the maximum TX power at every given period (for example, 1.25 ms) during a call connection mode. In Step 215, the mobile terminal checks whether the timer has expired. If the timer has expired in Step 215, the process ends, and if the timer has not expired, the process proceeds to Step 217.

In Step 217, the mobile terminal checks whether the TX power limit mode is terminated by key manipulation. If the TX power limit mode is not terminated in Step 217, the process returns to Step 205, and if the TX power limit mode is terminated, the process proceeds to Step 219.

Accordingly, the user can manually convert the TX power limit mode into a general TX power control mode when he is inconvenienced due to a degraded call quality during the TX power limit mode.

As described above, the present invention can extend a call duration by limiting the reverse maximum TX power in the mobile terminal. The mobile terminal performs the reverse TX power control so as to maintain a stable call quality. However, there may occur a case where the user of the mobile terminal must make a long and important call while accepting a rather poor call quality. In this case, the present invention resets the final TX power by subtracting the maximum TX power limit reference value from the maximum TX power set through the reverse TX power control, thereby making it possible to reduce the battery power consumption of the mobile terminal and thus extend the call duration.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for controlling reverse TX power in a mobile terminal, the apparatus comprising:
    a closed-loop power controller for limiting a TX power increase due to a power control bit of an RX signal by using a power-up limit bit and outputting a closed-loop power control value for decreasing the TX power when a TX power limit mode is selected;
    an adder for calculating a TX power by adding the closed-loop power control value and an open-loop power set using a power of the RX signal; and
    a maximum TX power limiter for setting a final TX power by subtracting a maximum TX power limit reference value determined according to an RX signal strength in the mobile terminal from the calculated TX power.

2. The apparatus of claim 1, further comprising:
a compensator for compensating for nonlinearity generated when the final TX power is amplified;
a gain detector for generating a gain value for controlling a gain of an amplifier according to the compensated final TX power; and
a TX automatic gain control amplifier for amplifying power of a signal using the generated gain value.

3. The apparatus of claim 1, wherein the maximum TX power limiter updates the maximum TX power limit reference value at given time intervals.

4. The apparatus of claim 1, further comprising:
a TX power compensator for coupling an output TX signal, measuring power of the output TX signal, comparing the measured power with the set TX power, and generating a TX compensation value for compensating for a difference between the set TX power and the output TX power,
wherein the maximum TX power limiter compensates the final TX power using the TX compensation value received from the TX power compensator.

5. A method for controlling reverse TX power in a mobile terminal, comprising:
setting a maximum TX power limit reference value according to an RX signal strength in the mobile terminal when a TX power limit mode is selected;
setting a closed-loop power control value indicating power up/down according to a power control bit of the RX signal;
calculating a TX power by adding the closed-loop power control value and an open-loop power set using an RX power of the RX signal;
comparing the an RX signal strength of the RX signal with a predetermined RX signal strength; and
determining a final TX power by subtracting the maximum TX power limit reference value from the calculated TX power when the RX signal strength of the RX signal is stronger than the predetermined RX signal strength.

6. The method of claim 5, further comprising limiting an increase of the TX power due to the power control bit using a closed-loop power control bit.

7. The method of claim 5, further comprising:
operating a timer expiring after an elapse of a given time period;
determining whether the TX power limit mode is terminated when the timer expires;
performing a general closed-loop power control when the TX power limit mode is terminated; and
re-performing the TX power limit mode when the TX power limit mode is not terminated.

8. The method of claim 5, further comprising:
coupling an output TX signal, measuring power of the output TX signal, comparing the measured power with a set TX power, and generating a TX compensation value for compensating for a difference between the set TX power and the output TX power; and
compensating the final TX power using the TX compensation value.

* * * * *